United States Patent
Batra et al.

(10) Patent No.: US 9,402,231 B2
(45) Date of Patent: Jul. 26, 2016

(54) COMMUNICATION BETWEEN WIRELESS DEVICES CAPABLE OF COMMUNICATING USING MULTIPLE MAC PROTOCOLS

(71) Applicant: GainSpan Corporation, San Jose, CA (US)

(72) Inventors: Vishal Batra, Bangalore (IN); Pankaj Vyas, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 84 days.

(21) Appl. No.: 14/514,398

(22) Filed: Oct. 15, 2014

(65) Prior Publication Data

US 2016/0112951 A1    Apr. 21, 2016

(51) Int. Cl.
| | |
|---|---|
| G08C 17/00 | (2006.01) |
| H04W 52/02 | (2009.01) |
| H04W 68/00 | (2009.01) |
| H04W 72/04 | (2009.01) |
| H04W 76/02 | (2009.01) |
| H04L 29/06 | (2006.01) |
| H04W 4/00 | (2009.01) |

(52) U.S. Cl.
CPC .......... *H04W 52/0222* (2013.01); *H04L 69/08* (2013.01); *H04W 4/008* (2013.01); *H04W 68/005* (2013.01); *H04W 72/0493* (2013.01); *H04W 76/023* (2013.01)

(58) Field of Classification Search
CPC .......... H04W 52/0222; H04W 68/005; H04W 72/0493; H04W 76/023; H04W 4/008; H04L 69/08
See application file for complete search history.

(56) References Cited

U.S. PATENT DOCUMENTS

| | | | | |
|---|---|---|---|---|
| 6,895,255 | B1 * | 5/2005 | Bridgelall | H04L 29/06 370/329 |
| 2006/0287008 | A1 * | 12/2006 | Twitchell, Jr. | H04W 76/04 455/574 |
| 2007/0275669 | A1 * | 11/2007 | Rietman | H04W 28/06 455/70 |

(Continued)

FOREIGN PATENT DOCUMENTS

WO    2013184110 A1    12/2013

OTHER PUBLICATIONS

Imagination announces world's first Wi-Fi, Bluetooth, FM combo IP, http://www.imgtec.com/news/detail.asp?ID=810, downloaded circa Jul. 17, 2014, pp. 1-2.

(Continued)

*Primary Examiner* — Robert Wilson
(74) *Attorney, Agent, or Firm* — IPHorizons PLLC; Narendra Reddy Thappeta (57) ABSTRACT

A first wireless device and a second wireless device are each capable of communicating using multiple MAC protocols. The first wireless device sets a first receiver to a power savings mode, the first receiver designed to operate according to a first MAC protocol. The first wireless device then receives, from the second wireless device, an indication on a second receiver corresponding to a second MAC protocol that data is available to be transmitted to the first wireless device from the second wireless device. In response to receipt of the indication, the first wireless sets the first receiver to an active mode, and receives the data from the second wireless device using the first receiver operating in accordance with the first MAC protocol. The second receiver consumes less power than the first receiver. Reduction of power consumption in the first wireless device may be achieved.

20 Claims, 5 Drawing Sheets

(56) References Cited

U.S. PATENT DOCUMENTS

| | | | | |
|---|---|---|---|---|
| 2012/0120860 | A1* | 5/2012 | Chui | H04B 1/711 370/311 |
| 2012/0250597 | A1 | 10/2012 | Park | |
| 2012/0250731 | A1* | 10/2012 | Taghavi Nasrabadi | H04W 88/06 375/147 |
| 2013/0045684 | A1 | 2/2013 | Linde et al. | |
| 2013/0065584 | A1 | 3/2013 | Lyon et al. | |
| 2014/0050133 | A1* | 2/2014 | Jafarian | H04W 74/085 370/311 |
| 2014/0112229 | A1* | 4/2014 | Merlin | H04W 52/0209 370/311 |
| 2014/0179253 | A1* | 6/2014 | Gudem | H04B 7/0871 455/326 |
| 2014/0257597 | A1* | 9/2014 | Miller | G06F 13/387 701/3 |
| 2015/0194992 | A1* | 7/2015 | Rasbornig | H04B 1/16 375/316 |

OTHER PUBLICATIONS

How to integrate a Bluetooth module into a device, http://www.bcdmicro.co.uk/bluetooth.html, downloaded circa Jul. 17, 2014, pp. 1-2.

Bluetooth and WiFi integration: Solving co-existence challenges, http://defenseelectronicsmag.com/site-files/defenseelectronicsmag.com/files/archive/rfdesign.com/mag/410rfdf1.pdf, date Oct. 2004, pp. 20-26.

Ronak Chokshi, Yes! Wi-Fi and Bluetooth Can Coexist in Handheld Devices, http://www.marvell.com/wireless/assets/Marvell-WiFi-Bluetooth-Coexistence.pdf, date Mar. 2010, pp. 1-9.

Wireless Connectivity, http://www.ti.com/lit/sg/slab056c/slab056c.pdf, date 2014, Wireless Connectivity Guide, pp. 1-65.

Darwin Engwer, IEEE P802.11 Wireless LANs, Nortel, date Jul. 19, 2005, 1-9.

Specification vol. 0—Specification of the Bluetooth System—Master Table of Contents & Compliance Requirements; Covered Core Package version 4.2, pp. 1-2772, Bluetooth Specification Version 4.2 [vol. 0].

IEEE Standard for Information technology—Telecommunications and information exchange between systems Local and metropolitan area networks—Specific requirements Part 11: Wireless LAN Medium Access Control (MAC) and Physical Layer (PHY) Specifications, IEEE Std 802.11™—2012, pp. 1-2793, IEEE.

* cited by examiner

COMMUNICATION BETWEEN WIRELESS DEVICES CAPABLE OF COMMUNICATING USING MULTIPLE MAC PROTOCOLS

BACKGROUND

1. Technical Field

Embodiments of the present disclosure relate generally to wireless devices, and more specifically to communication between wireless devices capable of communicating using multiple MAC (medium access control) protocols.

2. Related Art

A wireless device refers to a device communicating with one or more other devices using a wireless medium. MAC protocols are the basis for sharing a wireless medium among multiple devices, particularly when the communication ranges of such devices overlap. Frequency division multiplexing, time division multiplexing, code division multiple access, carrier sense multiple access (CSMA CD/CSMA CA), etc., are the common techniques forming the basis for MAC protocols.

Wireless devices are often provided the capability to communicate using multiple MAC protocols. For example, devices are often provided capabilities to communicate using IEEE 802.11 standards (also referred to as WLAN or WiFi™, Bluetooth™, Bluetooth Low Energy (BLE), GSM, etc., as suited in corresponding environments.

Aspects of the present disclosure are directed to communication between wireless devices provided with such capabilities to communicate using multiple MAC protocols.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present disclosure, a first wireless device and a second wireless device are each capable of communicating using multiple MAC protocols. The first wireless device sets a first receiver to a power savings mode, with the first receiver being designed to operate according to a first MAC protocol. The first wireless device then receives, from the second wireless device, an indication on a second receiver corresponding to a second MAC protocol that data is available to be transmitted to the first wireless device from the second wireless device. In response to receipt of the indication, the first wireless sets the first receiver to an active mode, and receives the data from the second wireless device using the first receiver operating in accordance with the first MAC protocol.

In an embodiment, the first wireless device and second wireless device are respectively a wireless station and an access point according to IEEE 802.11 (WLAN) standards, the first MAC protocol is the WLAN protocol and the second MAC protocol is the BLE MAC protocol. Due to the higher bandwidth at which receivers of WLAN protocol operate (compared to BLE), data transfer may be accomplished in a shorter duration. As receivers with BLE protocol operate at lower power consumption, the power consumption in the first wireless device during idle transmit/receive durations is reduced.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
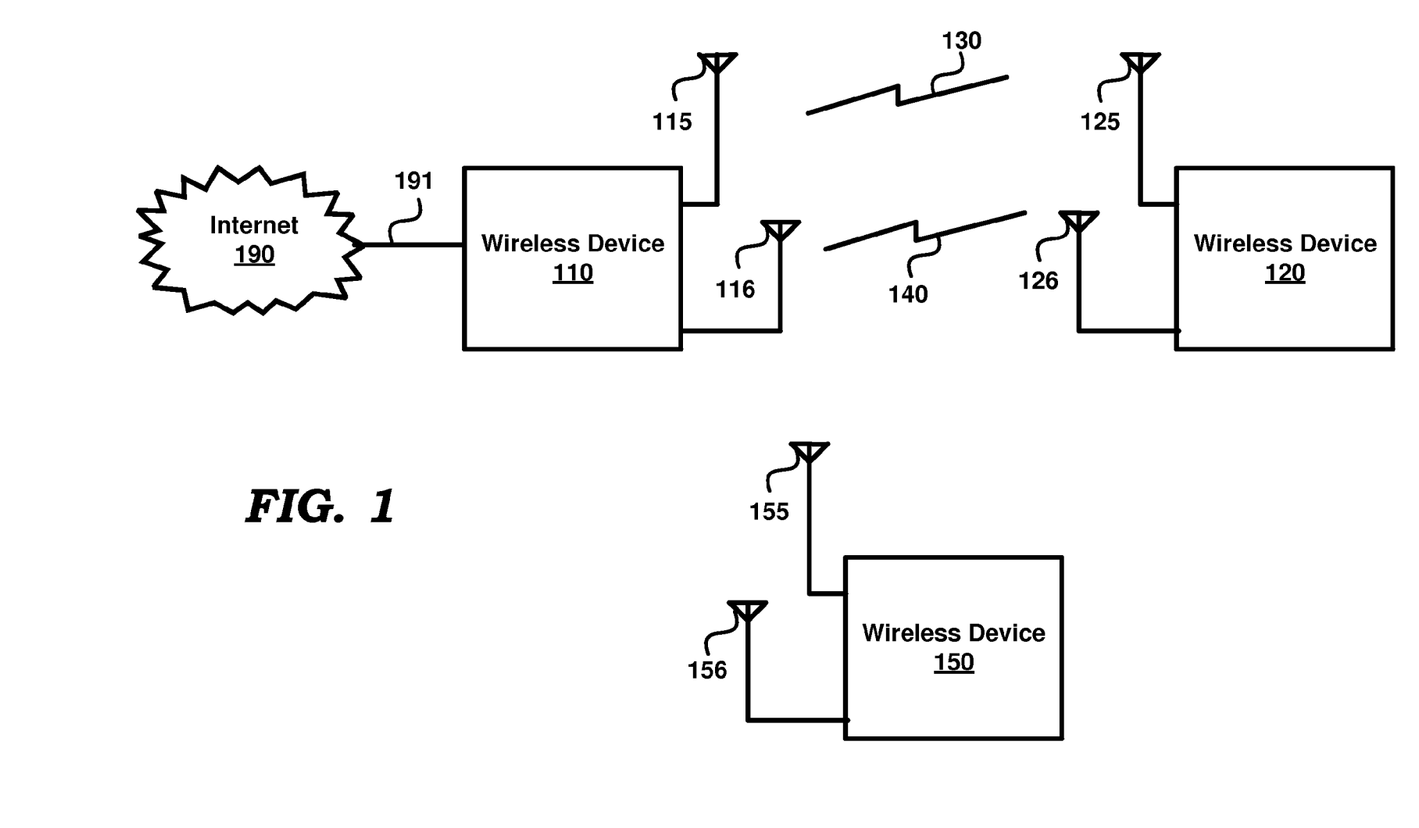
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems. FIG. 1 is shown containing wireless devices 110, 120 and 150, and internet 190. Only three wireless devices are shown for conciseness. However, the environment of FIG. 1 may contain more than three wireless devices also.

Internet 190 extends the connectivity of wireless devices 110, 120 and 150 to various systems (not shown) connected to Internet 190, and is shown connected to wireless device 110 on a wired path 191. Wireless devices 120 and 150 may access devices/systems in internet 190 via wireless device 110. Internet 190 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Wireless devices 110, 120 and 150 are capable of communicating with each other on a wireless medium, and using multiple MAC protocols. Thus, wireless device 110 is shown containing antennas 115 and 116, each antenna for wireless communication using a corresponding one of two MAC protocols. Similarly, wireless device 120 is shown containing antennas 125 and 126, each for wireless communication using a corresponding one of two MAC protocols (and corresponding receivers), and wireless device 150 is shown containing antennas 155 and 156, each for wireless communication using a corresponding one of two MAC protocols. Each of wireless devices 110, 120 and 150 is assumed to contain corresponding RF (radio frequency) and baseband processing circuits for enabling communication (transmission and/or reception) using each of the corresponding protocols.

In the wireless devices of FIG. 1, a separate antenna is shown as being used for transmitting and receiving wireless signals according to each MAC protocol. However, a same (single) antenna can also be used for transmitting and receiving wireless signals of multiple MAC protocols (of respective receiver and transmitter circuits). The IP protocol noted above operates on top of such MAC protocols.

In FIG. 1, wireless signals 130 depict communication between wireless devices 110 and 120 using one MAC protocol (and using antennas 115 and 125), and wireless signals 140 depict communication between wireless devices 110 and 120 using another MAC protocol (and using antennas 116 and 126). Similar communication using the two protocols can occur between wireless devices 110 and 150 as well. Wireless devices may be deployed with the capability to communicate with multiple MAC protocols, for example, to be able to communicate with multitude of devices with corresponding communication capabilities.

The description is continued with the description of a flowchart illustrating the manner in which one such wireless device communicates with another such wireless device, for reduced power consumption, in an embodiment.

3. Reducing Power Consumption in a Wireless Device

Figure 2:
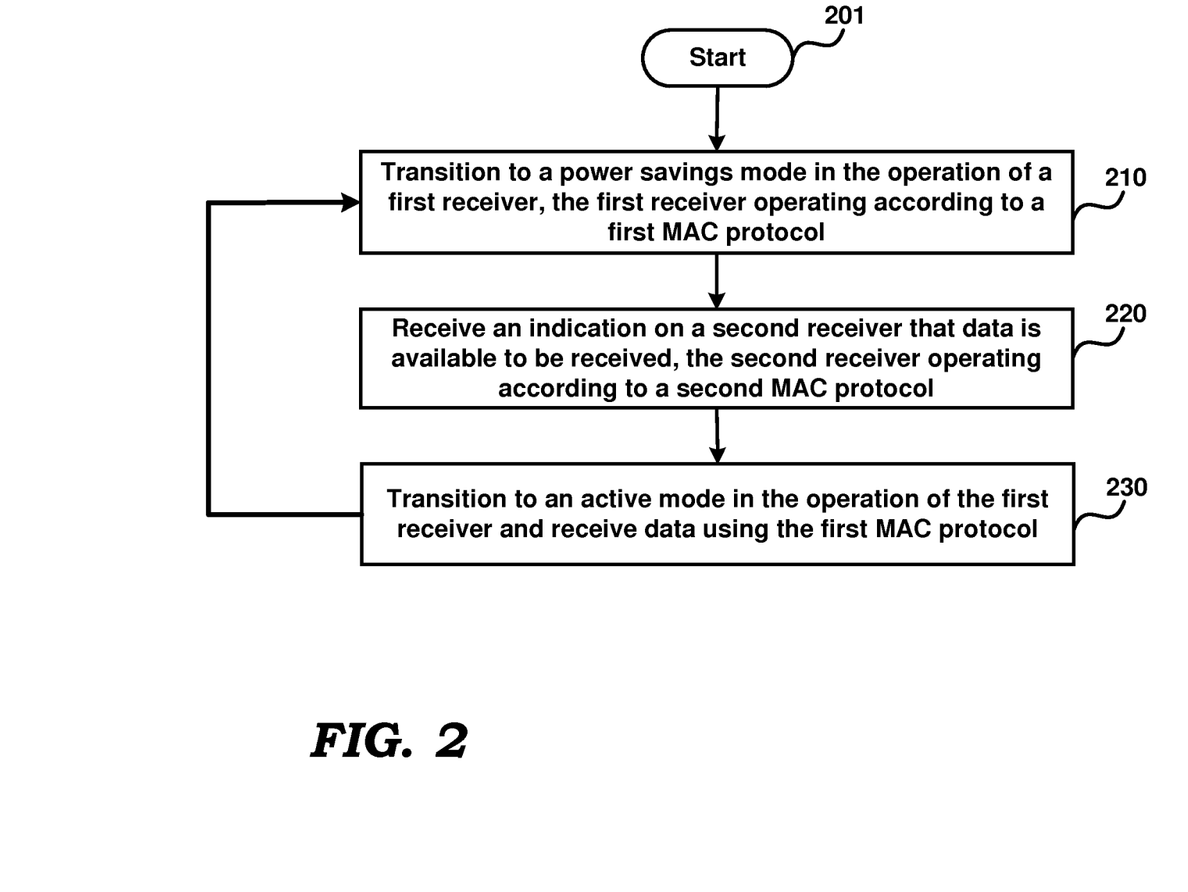
FIG. 2 is a flow chart illustrating the manner in which a wireless device enabled with multiple MAC protocols, communicates with another wireless device, in an embodiment.

FIG. 2 is a flow chart illustrating the manner in which a wireless device communicates with another wireless, in an embodiment of the present disclosure. Merely for illustration, the flowchart is described below as being performed in wireless device 120, which is assumed to require operation in power savings mode when communicating with wireless device 110. However, the features can be implemented in the other wireless devices of FIG. 1, as well as other systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, wireless device 120 transitions to a power savings mode in the operation of a first receiver contained in wireless device 120. The first receiver operates according to a first MAC protocol, and may represent either the RF portion alone of the receiver or RF and baseband signal processing portions of the first receiver. One or both of the RF (which normally consumes high power when operational) as well as baseband signal processing portions may be powered down when the first receiver is in power savings mode. When in the power savings mode, the first receiver is incapable of receiving data. Control then passes to step 220.

In step 220, wireless device 120 receives, from wireless device 110, on a second receiver contained in wireless device 120, an indication that data is available to be transmitted to wireless device 120 from wireless device 110. The second receiver operates according to a second MAC protocol. The indication may be received after wireless device 120 transitions to the power savings mode (in step 210). Control then passes to step 230.

In step 230, wireless device 120, in response to receiving the indication (of step 220), transitions to an active mode in the operation of the first receiver, and receives data from wireless device 110 using the first receiver according to the first MAC protocol. Thus, on receiving the indication from wireless device 110, the portions of the first receiver which were powered down (in step 210) are powered ON, and are used to receive data from wireless device 110. Control then passes to step 210, and the corresponding steps of the flowchart of FIG. 2 may be repeated.

Figure 3:
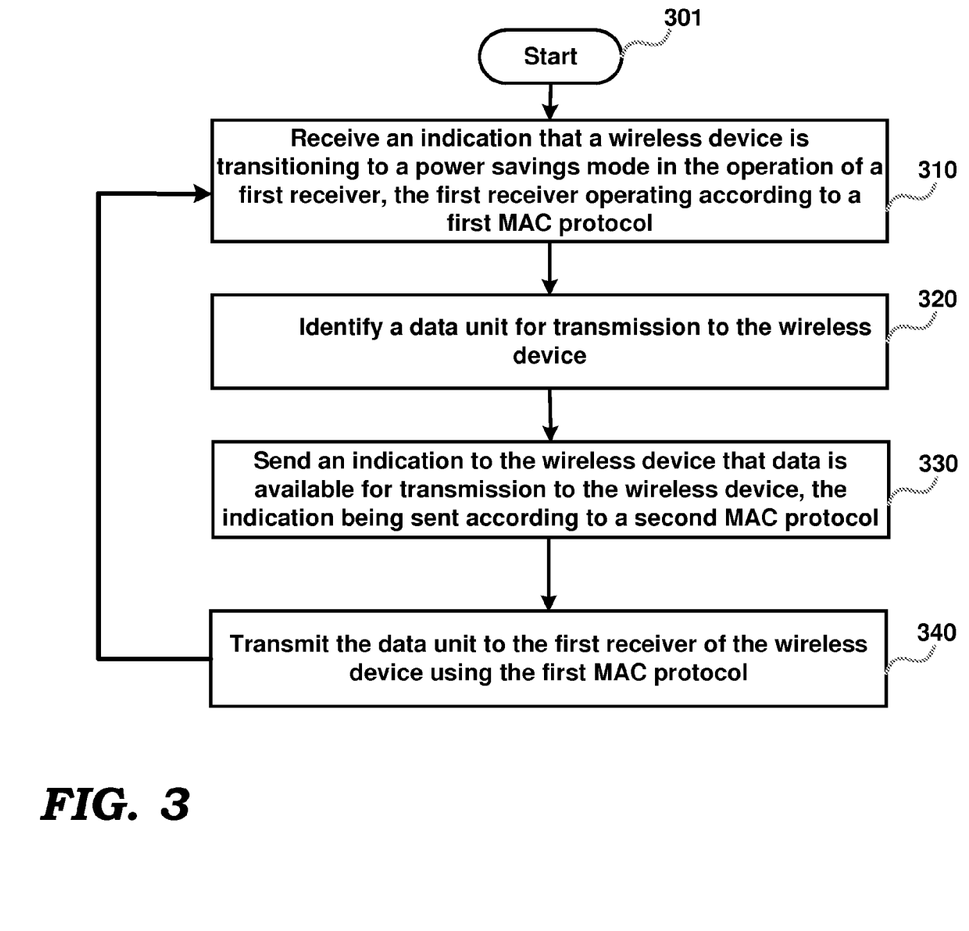
FIG. 3 is a flow chart illustrating the manner in which a wireless device enabled with multiple MAC protocols, communicates with another wireless device, in yet another embodiment.

FIG. 3 is another flowchart illustrating the manner in which a wireless device communicates with another wireless device. Merely for illustration, the flowchart of FIG. 3 is described below as being performed in wireless device 110, to enable power savings in wireless device 120 in accordance with the description of FIG. 2 above. However, the features can be implemented in the other wireless devices of FIG. 1, as well as other systems and environments also without departing from the scope and spirit of various aspects of the present invention, as will be apparent to one skilled in the relevant arts by reading the disclosure provided herein. In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 301, in which control immediately passes to step 310.

In step 310, wireless device 110 receives an indication that a first receiver in wireless device 120 is transitioning to power savings mode. The first receiver operates according to a first MAC protocol. Wireless device 110 may receive the indication via a receiver contained in wireless device 110 that also operates according to the first MAC protocol. Control than passes to step 320.

In step 320, wireless device 110 identifies a data unit for transmission to wireless device 120. The data unit may correspond to one received from an external device/system, such as for example, wireless device 150 or a device in internet 190. Control then passes to step 330.

In step 330, wireless device 110 sends an indication to wireless device 120 using a second MAC protocol to indicate that data is available to be transmitted to wireless device 120 from wireless device 110. Wireless device 110 may send the indication via a transmitter in wireless device 110 that operates according to the second MAC protocol, and wireless device 120 may receive the indication via a receiver in wireless device 120 that operates according to the second MAC protocol. Wireless device 110 may send the indication of data availability at a time instance later than when wireless device 110 receives the indication of step 310. Control then passes to step 340.

In step 340, wireless device 110, after sending the indication of step 330, transmits the data unit to wireless device 120 using the first MAC protocol. Wireless device 110 may transmit the data via a transmitter in wireless device 110 that operates according to the first MAC protocol. Wireless device 120 may receive the data unit via the first receiver, and process the data unit suitably, after which wireless device 110 may again set the first receiver to power savings mode. Control then passes to step 310, and the corresponding steps may be repeated.

The first MAC protocol and the second MAC protocol noted in the flowcharts of FIG. 2 and FIG. 3 are the same. The steps of the flowcharts of FIG. 2 and FIG. 3 may be co-operatively performed by wireless devices 110 and 120. It is also noted that wireless device 110 may maintain a list of all wireless devices (such as wireless device 120) which are 'presently' in power savings mode, and inspect the list to check if a corresponding wireless device is present in the list whenever wireless device 110 has data to be transmitted to that wireless device. Wireless device 110 may then send an indication using the second MAC protocol to the wireless device indicating that data is available to be transmitted.

In an embodiment of the present disclosure, wireless device 110 and wireless device 120 referred to in the flowcharts of FIG. 2 and FIG. 3 are respectively an access point (AP, referred to below as AP 110) and a wireless station (STA, referred to below as STA 120) according to IEEE 802.11 standards, the first MAC protocol is the IEEE 802.11 (WLAN) MAC protocol, and the second MAC protocol is Bluetooth™ Low Energy (BLE) MAC protocol, maintained by the Bluetooth® Special Interest Group.

In the embodiment, each of AP 110 and STA 120 is implemented with an IEEE 802.11 (WLAN or wireless local area network or WiFi™) transceiver (receiver and transmitter) as well as a BLE transceiver (receiver and transmitter). Transmissions and reception of wireless signals using the first protocol are done using the WLAN transceivers, while transmissions and reception of wireless signals using the second protocol are done using the BLE transceivers.

The combined operation of the steps of the flowcharts of FIG. 2 and FIG. 3 with wireless device 110 as AP 110, and wireless device 120 as STA 120 is described next with reference to timing diagrams.

4. Timing Diagram

Figure 4:
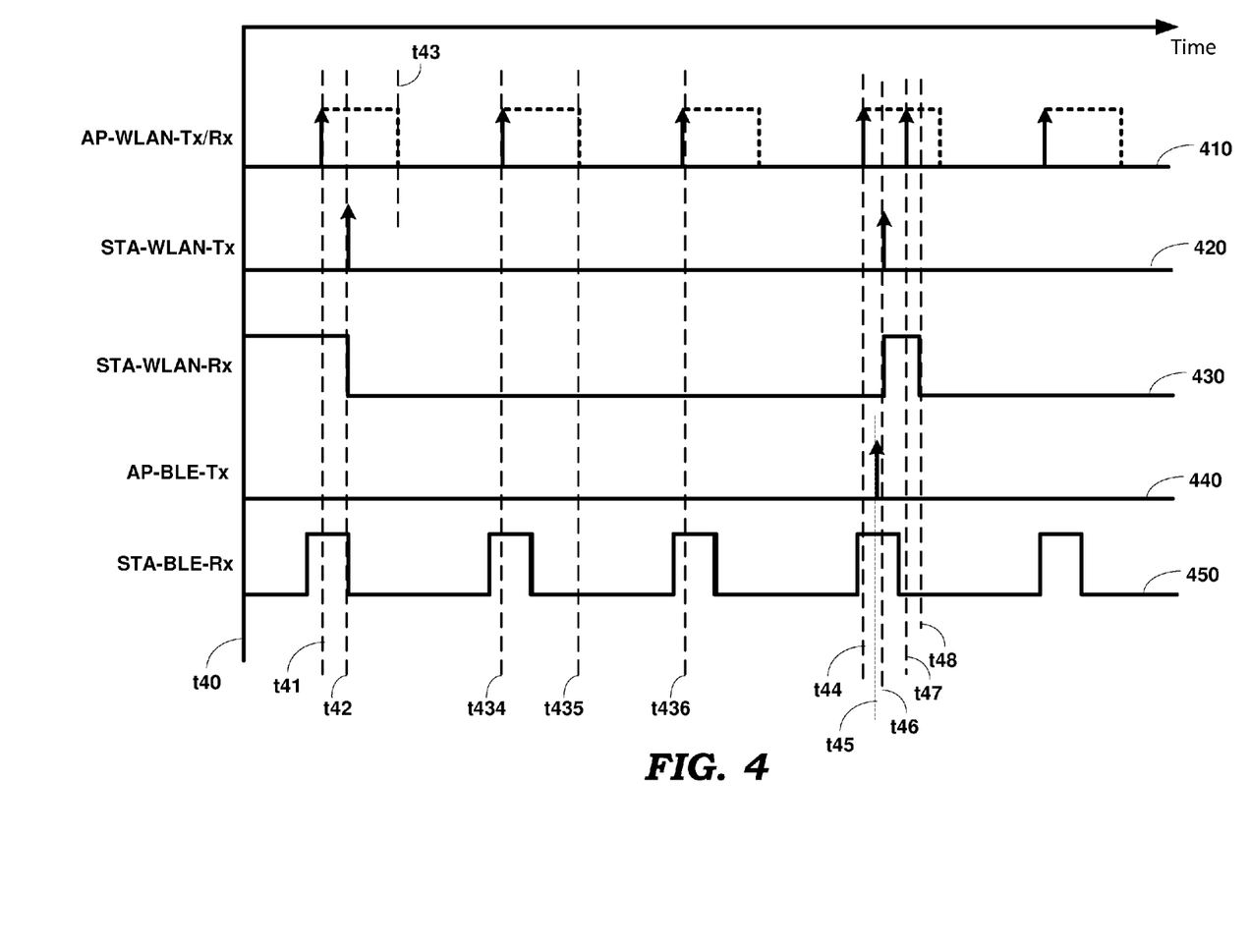
FIG. 4 is a timing diagram illustrating the interaction between two wireless devices in an embodiment.

FIG. 4 is a timing diagram illustrating the operations in corresponding blocks (receiver, transmitter, etc.) of AP 110 and STA 120 when AP 110 and STA 120 communicate with each other according to the flowcharts of FIG. 2 and FIG. 3 described above. It is assumed in the description below that each of AP 110 and STA 120 contains a WLAN transmitter, a WLAN receiver, a BLE transmitter, and a BLE receiver. The corresponding transmitter/receivers are described in further detail with respect to FIG. 5 below.

Waveform 410 (AP-WLAN-Tx/Rx) represents signal transmissions from, and signal receptions at, the WLAN transmitter of AP 110. Waveform 420 (STA-WLAN-Tx) represents, transmission from the WLAN transmitter of STA 120. Waveform 430 (STA-WLAN-Rx) represents the operational state of the WLAN receiver of STA 120, with logic high indicating power ON, and logic low indicating power savings mode. Waveform 440 (AP-BLE-Tx) represents transmissions from the BLE transmitter of AP 110. Waveform 450 (STA-BLE-Rx) represents the operational state of the BLE receiver of STA 120, with logic high indicating power ON, and logic low indicating power savings mode.

It is noted that the waveforms of FIG. 4 are not to scale. Further, the specific sequence of transmission/reception etc., shown in FIG. 4 can deviate from that shown there provided the desired effect of reliably powering up the WLAN receiver of STA 120 to receive the buffered data is ensured.

In the timing diagram of FIG. 4, it is assumed that STA 120 has associated and authenticated with AP 110 sometime prior to t40. During such association, STA 120 may negotiate with AP 110 to indicate the capability to operate in power-savings mode (including indicating the ability to receive on BLE receiver and corresponding address information), in accordance with the features of the present disclosure. It is also assumed that, during such negotiation, STA 120 has synchronized its internal clock with that of AP 110, and has provided the frequency as well as start times of beacon transmissions from AP 110 to the BLE receiver in STA 120. As may be readily understood only some of the STAs may have the ability to operate in power-savings mode.

Time intervals t41-t43, t434-t435, etc., (in general logic high intervals) of waveform 410 represent intervals in which AP 110 transmits and/or receives WLAN signals (data, control, etc.). AP 110 may transmit data (for example, directed to other wireless devices such as wireless device 150 of FIG. 1) in addition to the periodic beacons (according to WLAN) via the WLAN transmitter in such intervals. The BLE receiver of STA 120 is shown as being in an ON state when each beacon (e.g., at t41, t434, t44, etc.) is transmitted by AP 100, as indicated by the logic high portions of waveform 450.

At t42, WLAN transmitter of STA 120 transmits either a NULL frame or a data frame, with the "Power Management" bit in the "Frame Control" field of the NULL frame or data frame set to one, indicating that the WLAN receiver of STA 120 is transitioning to power savings mode (step 210). AP 110 receives the indication at, or slightly later, than t42 (step 310).

At, or slightly later than, t42, the WLAN receiver of STA 120 is powered-down, as indicated by the logic high to logic low transition of waveform 430 at t42. It is noted here that several power savings techniques can be used in STA 120. For example, power to the entire WLAN receiver (RF plus baseband portions) can be switched off, or power only to the RF portion of WLAN receiver can be switched off. Another technique is to switch-off power to the RF portion of the WLAN receiver, while gating-off the clock to the baseband processing portion. Power savings mode as used herein refers to an operating state of WLAN receiver of STA 120, in which the WLAN receiver of STA 120 is not capable of receiving or processing data.

Sometime between t436 and t44, AP 110 receives data (for e.g., from wireless device 150 or a device in internet 190 of FIG. 1) destined for STA 120 (step 320). AP 110 locally (internal to AP 110) stores/buffers the data. In the traffic indication map (TIM) field of the beacon transmitted at t44, AP 110 indicates that AP 110 has data to be transmitted to STA 120. In addition, at t45, AP 110 transmits the same information (i.e., that AP 110 has data to be transmitted to STA 120) from its BLE transmitter, as indicated by the vertical arrow in waveform 440 (step 330). AP 110 may transmit the information in an appropriate BLE frame, the design of which will be apparent to a skilled practitioner. It is noted that the time instance of transmission through BLE transmitter of AP 110 is shown as occurring slightly later than t44 merely for clarity, and that such transmission can coincide with t44 also, or occur even slightly earlier than t44.

Since the BLE receiver of STA 120 is in power-ON state during (or around, i.e., starting slightly earlier than and ending slightly later than) all beacon transmissions (and therefore during transmission via the BLE transmitter of AP 110 at t45), the BLE receiver of STA 120 receives the indication of t45 (step 220). In response, the BLE receiver of STA 120 sends a message (internally in STA 120) to a processing unit (or some other control unit) in STA 120, with the message indicating that data is available to be received by the WLAN receiver of STA 120. In response, the processing unit or control unit restores power to the WLAN receiver in STA 120. WLAN receiver of STA 120 transitions to a power-ON state (step 230), as indicated by the transition to logic high in waveform 430 at t46.

At t46, the WLAN transmitter of STA 120 transmits a power-save poll message (according to WLAN standards) to AP 110, as indicated by the vertical arrow in waveform 420 at t46.

In response to the receipt of the power-save poll message, AP 110 transmits, at t47, the buffered data destined for STA 120 to STA 120 (step 340). The WLAN receiver of STA 120 receives the data (step 230), and may process it suitably. The WLAN receiver of STA 120 may be set again to power savings mode, as indicated by the transition to logic low in waveform 430 at t48.

With respect to the example described above, it is noted that a BLE receiver typically consumes lesser power than a WLAN receiver. Hence, maintaining the BLE receiver of STA 120 in a power-ON state to receive data availability indications from AP 110, rather than the WLAN receiver of STA 120, may effectively reduce power consumption in STA 120.

Figure 5:
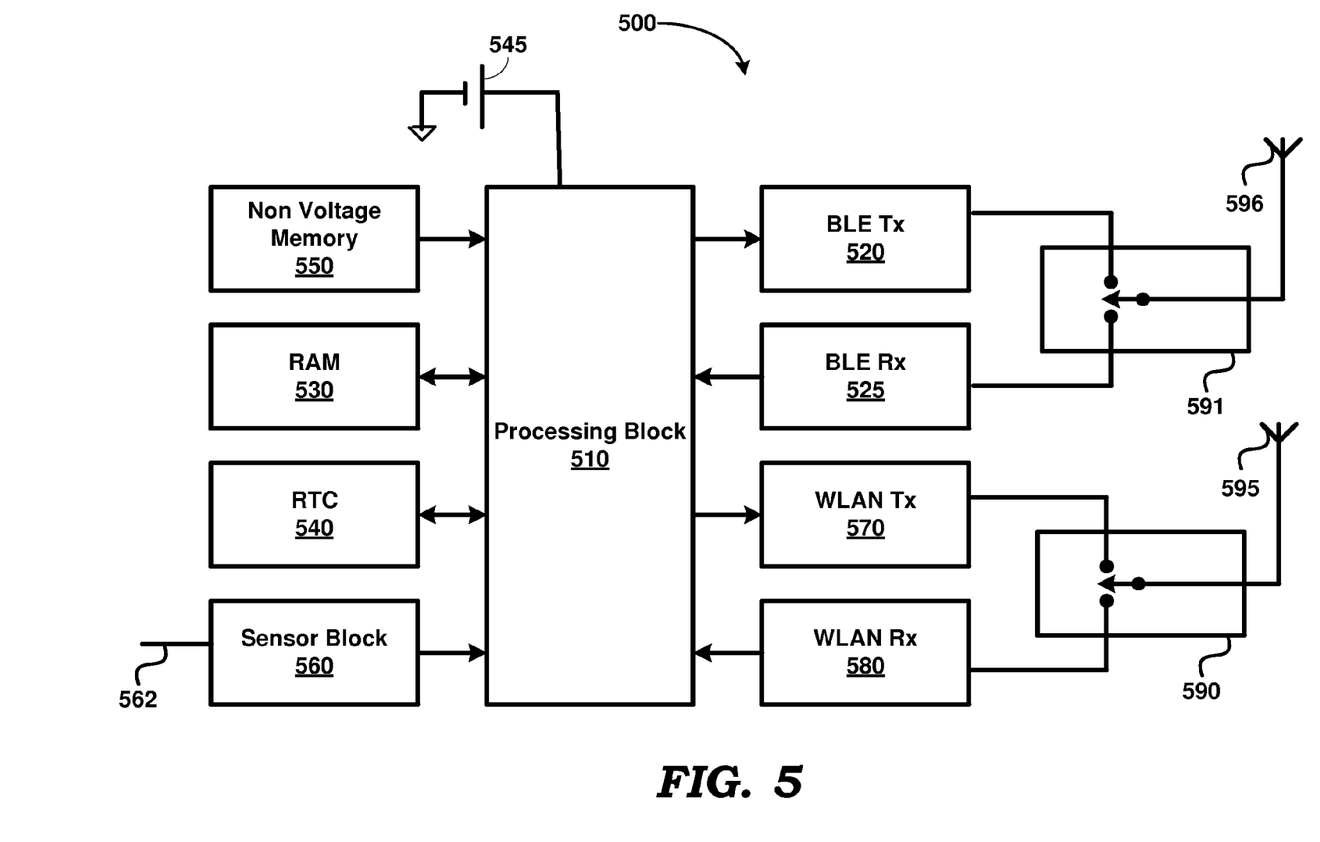
FIG. 5 is a block diagram illustrating the details of a wireless device in an embodiment.

In another embodiment, the BLE receiver of STA 120 is always (rather than periodically as shown in FIG. 5) maintained in the power-ON state.

In yet another embodiment, BLE receiver of STA 120 is powered-ON around the end of the listen interval of WLAN receiver of STA 120. As is well known in the relevant arts, 'listen interval' is a parameter negotiated between an AP and a STA when the STA associates with the AP (before t40), and is represented as a number of beacon periods for which the WLAN receiver of STA will be in power-saving mode. Thus, instead of the WLAN receiver being awake around the end of the listen interval, the BLE receives is turned ON to see if the data indication from AP 110 would be received. Accordingly, in comparison to FIG. 4, the BLE receiver is not in power ON mode for each beacon interval, but instead would be powered on only once every listen interval. Power consumption is reduced as a result as well.

It is noted here that whether STA 120 is allowed to place its WLAN receiver in power savings mode, may be controlled by a user/operator/administrator of the wireless network using an input mechanism to STA 120, for example in the form of a hard button or soft button (electronic button supported by a touch sensitive interface). A first signal generated by such buttons may indicate that the WLAN receiver can be placed in power savings mode, while a second signal generated by such buttons may indicate that the WLAN receiver is to be operated in active mode only.

Further, an application executing in STA 120 can also be designed to place the WLAN receiver of STA 120 in the power savings mode (or active mode) based on the occurrence of an event. An example of such an event (and corresponding signal) can be an indication from peer application (example executing in a device that STA 120 is in communication with in internet 190) that high speed data is going to be sent to STA 120 via its WLAN receiver. In response to such an indication, STA 120 maintains its WLAN receiver in active mode to receive the data. Only after completion of receipt of such data, is STA 120 allowed to (if deemed appropriate) to place its WLAN receiver in power savings mode. Thus, the capability/permission to operate WLAN receiver in power savings mode can be controlled in the manner described above.

The implementation details of a wireless device in an embodiment of the present disclosure are provided next.

5. Example Implementation

FIG. 5 is a block diagram showing the implementation details of a wireless device in an embodiment of the present disclosure. Wireless device 500 may correspond to any of wireless devices 110, 120 and 150 of FIG. 1, and is shown containing processing block 510, BLE transmitter (Tx) 520, BLE receiver (Rx) 525, random access memory (RAM) 530, real-time clock (RTC) 540, battery 545, non-volatile memory 550, WLAN transmitter (Tx) 570, WLAN receiver (Rx) 580, switches 590 and 591, and antennas 595 and 596. The combination of WLAN Tx 570 and WLAN Rx 580 is referred to herein as a WLAN transceiver. The combination of BLE Tx 520 and BLE Rx 525 is referred to herein as a BLE transceiver.

The whole of wireless device 500 may be implemented as a system-on-chip (SoC), except for battery 545 and antenna 595. Alternatively, the blocks of FIG. 5 may be implemented on separate integrated circuits (IC). When wireless device 500 represents AP 110, wireless device 500 may additionally contain (though not shown) a network interface to connect to internet 190 (FIG. 1), as well as input/output blocks for display and user inputs.

Battery 545 provides power for operation of wireless device 500, and may be connected to the various blocks shown in FIG. 5. Although not shown in FIG. 5, wireless device 500 contains corresponding circuitry (such as power switches, for example) for selectively powering-ON and powering-OFF WLAN Rx 580 and BLE Rx 525 (and optionally WLAN Tx 570 and BLE Tx 520 also) as described above. RTC 540 operates as a clock, and provides the 'current' time to processing block 510.

Antenna 595 operates to receive from, and transmit to, a wireless medium, corresponding wireless signals according to IEEE 802.11 (WLAN) standards. Switch 590 may be controlled by processing block 510 (connection not shown) to connect antenna 595 to one of blocks 570 and 580 as desired, depending on whether transmission or reception of WLAN signals is required. Antenna 596 operates to receive from, and transmit to, a wireless medium, corresponding wireless signals according to Bluetooth Low Energy (BLE) standards.

Switch 591 may be controlled by processing block 510 (connection not shown) to connect antenna 596 to one of blocks 520 and 525 as desired, depending on whether transmission or reception of BLE signals is required. Switches 590 and 591, and antennas 595 and 596, and the corresponding configuration of FIG. 5 are shown merely by way of illustration. A single antenna can instead be used for transmission and reception of WLAN signals, as well as for transmission and reception of BLE signals. Alternatively, a separate antenna can be used for each of WLAN transmission. WLAN reception, BLE transmission and BLE reception. Various other techniques, well known in the relevant arts, can also be used instead.

WLAN Tx 570 receives data to be transmitted according to WLAN standards and MAC protocol from processing block 510, generates a modulated radio frequency (RF) signal according to IEEE 802.11 standards, and transmits the RF signal via switch 590 and antenna 595. WLAN Tx 570 may contain RF and baseband circuitry for generating and transmitting WLAN signals, as well as for medium access operations. Alternatively, WLAN Tx 570 may contain only the RF circuitry, with processing block 510 performing the baseband and medium access operations (in conjunction with the RF circuitry). The transmit portions of waveform 410 of FIG. 4 correspond to transmissions from WLAN Tx 570, when wireless device 500 represents AP 110, and the transmissions of waveform 420 are performed by WLAN Tx 570 when wireless device represents STA 120.

WLAN Rx 580 receives an RF signal (according to WLAN standards) bearing data and/or control information via switch 590, and antenna 595, demodulates the RF signal, and provides the extracted data or control information to processing block 510. WLAN Rx 580 may contain the corresponding RF as well as baseband processing circuitry. Alternatively, WLAN Rx 580 may contain only the RF circuitry, with processing block 510 performing the baseband operations in conjunction with the RF circuitry. The receive operations of waveform 410 are performed by WLAN Rx 580, when wireless device 500 represents AP 110. The operational states and receive operations of waveform 420 correspond to those of WLAN Rx 580 when wireless device 500 represents STA 120. When wireless device 500 corresponds to wireless device 120/STA 120, WLAN Rx 580 may selectively be powered OFF and powered ON via circuitry such as power switches referred to above. Further, when WLAN Rx 580 includes baseband processing circuitry, such circuitry may also be selectively powered OFF and powered ON. Alternatively, the master clock provided for operation of such baseband circuitry may be capable of being gated OFF and gated ON by corresponding circuitry.

BLE Tx 520 receives data to be transmitted according to BLE standards and MAC protocol from processing block 510, generates a modulated radio frequency (RF) signal according to BLE standards, and transmits the RF signal via switch 590 and antenna 595. BLE Tx 520 may contain RF and baseband circuitry for generating and transmitting BLE signals, as well as for medium access operations. Alternatively, BLE Tx 520 may contain only the RF circuitry, with processing block 510 performing the baseband and medium access operations (in conjunction with the RF circuitry). The transmission(s) of waveform 440 of FIG. 4 is/are performed by BLE Tx 520 when wireless device 500 represents AP 110.

BLE Rx 525 receives an RF signal (according to BLE standards) bearing data and/or control information via switch 590, and antenna 595, demodulates the RF signal, and provides the extracted data or control information to processing block 510. BLE Rx 525 may contain the corresponding RF as well as baseband processing circuitry. Alternatively, BLE Rx 525 may contain only the RF circuitry, with processing block 510 performing the baseband operations in conjunction with the RF circuitry. The operational states and receive operations of waveform 450 correspond to those of BLE Rx 525 when wireless device 500 represents STA 120. When wireless device 500 corresponds to wireless device 120/STA 120, BLE Rx 580 may be implemented with the capability to be selectively powered OFF and powered ON.

Non-volatile memory 550 is a non-transitory machine readable medium, and stores instructions, which when executed by processing block 510, causes wireless device 500 to operate as described above as wireless device 110/AP 110 and wireless device 120/STA 120, depending on whether wireless device 500 represents wireless device 110/AP 110 or wireless device 120/STA 120. In particular, the instructions enables device 500 to operate as described with respect to the flowcharts of FIGS. 2 and 3, when implemented correspondingly.

Processing block 510 (or processor in general) may contain multiple processing units internally, with each processing unit potentially being designed for a specific task. Alternatively, processing block 510 may contain only a single general-purpose processing unit. Processing block 510 may execute instructions stored in non-volatile memory 550 or RAM 530 to enable device 500 to operate according to several aspects of the present disclosure, described above in detail. Processing block 510 may issue control signals to power-ON/power-OFF WLAN Rx 580 and BLE Rx 525 when device 500 corresponds to wireless device 120/STA 120. Processing block 510 may also issue control signals to power-ON/power-OFF WLAN Tx 570 and BLE Tx 520 when device 500 corresponds to wireless device 120/STA 120.

RAM 530 is a volatile random access memory, and may be used for storing instructions and data. The data may include the identity of the STAs indicated to have capability to operate in power-savings mode (as described above with respect to negotiation with STAs), and the corresponding parameters (the address of BLE transmitter and BLE receiver for each STA, beacon interval, information required for transmission on BLE transmitter, etc.) such that STAs in the list can be notified of availability of corresponding pending packets, if any, for delivery.

The data also include a list of wireless devices 'presently' in power savings mode maintained by wireless device 110 may be stored in RAM 530. When a data unit is received for a STA, processing block 510 may examine the list to determine whether the data unit is destined to one of the STAs in the list. Processing block 510 identifies the MAC address of the BLE receiver of STA 120 (from the above noted data, determined during negotiation), and uses the MAC address to notify (the BLE receiver of STA 120) the availability of pending packet for WLAN receiver of STA 120.

RAM 530 and non-volatile memory 550 (which may be implemented in the form of read-only memory/ROM/Flash) constitute computer program products or machine (or computer) readable medium, which are means for providing instructions to processing block 510. Thus, such medium can be in the form of removable (floppy, CDs, tape, etc.) or non-removable (hard drive, etc.) medium. Processing block 510 may retrieve the instructions, and execute the instructions to provide several features of the present disclosure.

6. CONCLUSION

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method by which a first wireless device communicates with a second wireless device, both of said first wireless device and said second wireless device being enabled to communicate with each other using a first MAC protocol and a second MAC protocol, said method comprising:
   transitioning, at a first time instance, to a power savings mode in the operation of a first receiver corresponding to said first MAC protocol, wherein said first receiver is incapable of receiving data in said power savings mode;
   receive, at a second time instance, an indication on a second receiver corresponding to said second MAC protocol from said second wireless device, wherein said indication indicates that data is available to be transmitted to said first wireless device from said second wireless device;
   in response to receipt of said indication, transitioning to an active mode in the operation of said first receiver and receiving data from said second wireless device using said first receiver operating in accordance with said first MAC protocol.

2. The method of claim 1, wherein said first wireless device is a wireless station, said second wireless device is an access point, said first MAC protocol is according to IEEE 802.11 protocol, and said second receiver operates to consume lower energy in a duration between said first time instance and said second time instance compared to said first receiver in said active mode, such that power savings is obtained in durations when said access point has no data to transmit to said wireless station.

3. The method of claim 2, wherein said second MAC protocol is Bluetooth Low Energy (BLE) protocol, wherein said power savings mode comprises switching off said receiver between said first time instance and said second time instance.

4. The method of claim 3, further comprising receiving a first signal indicating whether said first wireless device is allowed to transition to said power savings mode in the operation of said first receiver, wherein said transitioning to said power savings mode is permitted only if said first signal is received indicating that said first wireless device is allowed to transition to said power savings mode in the operation of said first receiver.

5. The method of claim 4, wherein said first signal is based on a button provided in said first wireless device, or based on communication with an application.

6. The method of claim 3, wherein said second receiver is in said active mode listening for said indication in an entire duration between said first time instance and said second time instance.

7. The method of claim 3, wherein said second receiver operates to be in said active mode in durations around respective ones of beacons transmitted by said first wireless device in accordance with said IEEE 802.11 protocol.

8. A method by which a second wireless device communicates with a first wireless device, both of said first wireless device and said second wireless device being enabled to communicate with each other using a first MAC protocol and a second MAC protocol, said method comprising:

receiving, at a first time instance, an indication that said first wireless device is transitioning to a power savings mode in the operation of a first receiver corresponding to said first MAC protocol, wherein said first receiver is incapable of receiving data in said power savings mode;

receiving a data unit for transmission to said first wireless device;

sending, at a second time instance, an indication using said second MAC protocol to said first wireless device, wherein said indication indicates that data is available to be transmitted to said first wireless device from said second wireless device;

after sending of said indication, transmitting said data unit to said first wireless device using said first MAC protocol.

9. The method of claim 8, wherein said first wireless device is a wireless station, said second wireless device is an access point, said first MAC protocol is according to IEEE 802.11 protocol, and said second receiver operates to consume lower energy in a duration between said first time instance and said time instance compared to said first receiver in said active mode such that power savings is obtained in durations when said access point has no data to transmit to said wireless station.

10. The method of claim 9, further comprising:

negotiating with said first wireless device, using said first MAC protocol, capability to receive on the said second receiver of said first wireless device based on said second MAC protocol, maintaining a list of all wireless devices which are presently in said power savings mode, wherein, when a data unit is available for transmission to a corresponding wireless device, said second wireless unit inspects said list to check if said corresponding wireless device is present in said list, and sends, an indication using said second MAC protocol to said corresponding wireless device indicating that data is available to be transmitted to said corresponding wireless device from said second wireless device.

11. The method of claim 10, wherein said power savings mode comprises switching off said first receiver between said first time instance and said second time instance.

12. The method of claim 11, wherein said second receiver is in said active mode listening for said indication in an entire duration between said first time instance and said second time instance.

13. The method of claim 12, wherein said second receiver operates to be in said active mode in durations around respective ones of beacons transmitted by said first wireless device in accordance with said IEEE 802.11 protocol, wherein said second MAC protocol is Bluetooth Low Energy (BLE) protocol.

14. A wireless device comprising:

a first transmitter and a first receiver, each operating according to a first MAC protocol;

a second transmitter operating according to a second MAC protocol;

a processor coupled to said first transmitter, said first receiver and said second transmitter, and operable to perform the actions of:

receiving at a first time instance, via said first receiver, an indication that a third receiver of an another wireless device is transitioning to a power savings mode, said indication being received from a third transmitter of said another wireless device, wherein each of said third receiver and said third transmitter operates according to said first MAC protocol, wherein said third receiver is incapable of receiving data in said power savings mode;

receiving a data unit for transmission to said another wireless device;

sending at a second time instance, via said second transmitter, an indication to a fourth receiver of said another wireless device, wherein said indication indicates that data is available to be transmitted to said another wireless device from said wireless device, wherein said fourth receiver operates according to said second MAC protocol; and after sending of said indication, transmitting via said first transmitter, said data unit to said another wireless device, wherein said another wireless device receives said data unit via said third receiver.

15. The wireless device of claim 14, wherein wireless device is an access point (AP), said another wireless device is a wireless station (STA), said first MAC protocol is according to IEEE 802.11 protocol, said second MAC protocol is according to Bluetooth low energy protocol, said first receiver and said first transmitter are respectively a WLAN receiver and a WLAN transmitter, said second receiver and said second transmitter are respectively a BLE transmitter and a BLE receiver, wherein said third receiver operates to consume lower energy in a duration between said first time instance and said time instance compared when said third receiver in an active mode such that power savings is obtained in said another wireless device in durations when said AP has no data to transmit to said ATA.

16. The wireless device of claim 15, wherein said AP maintains a list of all STAs which are presently in said power savings mode,
 wherein, when a data unit is available for transmission to a corresponding STA, said AP inspects said list to check if said corresponding STA is present in said list, and sends an indication via said second transmitter to a corresponding receiver of said corresponding STA,
 wherein said indication indicates that data is available to be transmitted to said corresponding STA from said AP.

17. The wireless device of claim 16, wherein said power savings mode comprises switching off said third receiver for the duration between said first time instance and said second time instance,
 wherein said fourth receiver operates to be in said active mode in durations around respective ones of beacons transmitted by said AP in accordance with said IEEE 802.11 protocol.

18. The wireless device of claim 17, wherein said fourth receiver is in said active mode listening for said indication in an entire duration between said first time instance and said second time instance.

19. A first wireless device for communicating with a second wireless device, both of said first wireless device and said second wireless device being enabled to communicate with each other using a first MAC protocol and a second MAC protocol, said first wireless device comprising:
 a first transmitter and a first receiver operable according to said first MAC protocol;
 a second receiver operable according to said second MAC protocol;
 a processor coupled to said first transmitter, said first receiver and said second receiver, and operable to perform the actions of:
  transitioning, at a first time instance, to a power savings mode in the operation of said first receiver corresponding to said first MAC protocol, wherein said first receiver is incapable of receiving data in said power savings mode;
  receiving, at a second time instance, an indication on said second receiver corresponding to said second MAC protocol from said second wireless device, wherein said indication indicates that data is available to be transmitted to said first wireless device from said second wireless device;
  in response to receipt of said indication, transitioning to an active mode in the operation of said first receiver and receiving data from said second wireless device using said first receiver operating in accordance with said first MAC protocol.

20. The first wireless device of claim 19, wherein said first wireless device is a wireless station, said second wireless device is an access point, said first MAC protocol is according to IEEE 802.11 protocol, said second MAC protocol is according to Bluetooth Low Energy (BLE) protocol,
 wherein said second receiver operates to consume lower energy in a duration between said first time instance and said second time instance compared to said first receiver in said active mode, such that power savings is obtained in durations when said access point has no data to transmit to said wireless station.

* * * * *